(12) United States Patent
Frolovichev

(10) Patent No.: US 10,810,403 B2
(45) Date of Patent: Oct. 20, 2020

(54) APPARATUS AND METHOD FOR COORDINATING THE MATCHING AND INITIAL COMMUNICATIONS BETWEEN INDIVIDUALS IN A DATING APPLICATION

(71) Applicant: AMI Holdings Limited, Hamilton (BM)

(72) Inventor: Sergey Frolovichev, Hamilton (BM)

(73) Assignee: AMI Holdings Limited, Hamilton (BM)

( * ) Notice: Subject to any disclaimer, the term of this patent is extended or adjusted under 35 U.S.C. 154(b) by 111 days.

(21) Appl. No.: 16/175,372

(22) Filed: Oct. 30, 2018

(65) Prior Publication Data
US 2020/0134288 A1 Apr. 30, 2020

(51) Int. Cl.
*G06K 9/00* (2006.01)
*H04L 29/06* (2006.01)
*G06Q 50/00* (2012.01)

(52) U.S. Cl.
CPC ...... *G06K 9/00087* (2013.01); *H04L 63/0861* (2013.01); *G06Q 50/01* (2013.01)

(58) Field of Classification Search
CPC .......................... G06K 9/00087; G06Q 50/01
See application file for complete search history.

(56) References Cited

U.S. PATENT DOCUMENTS

| | | | |
|---|---|---|---|
| 5,815,595 A | 9/1998 | Gugler | |
| 7,203,674 B2 | 4/2007 | Cohen | |
| 7,684,651 B2 * | 3/2010 | Tang | G06F 16/583 382/305 |
| 7,760,917 B2 * | 7/2010 | Vanhoucke | G06K 9/00677 382/115 |
| 8,566,327 B2 | 10/2013 | Carrico | |
| 8,595,257 B1 * | 11/2013 | Ovide | G06Q 50/01 707/784 |
| D755,814 S | 5/2016 | Rad et al. | |
| 9,342,855 B1 * | 5/2016 | Bloom | G06K 9/6215 |
| D779,540 S | 2/2017 | Rad et al. | |

(Continued)

FOREIGN PATENT DOCUMENTS

| WO | WO 2016/076976 | 5/2016 |
|---|---|---|
| WO | WO 2017/054081 | 4/2017 |

OTHER PUBLICATIONS

Invitation to Pay Additional Fees in International Appln. No. PCT/IB2019/059318, dated Dec. 11, 2019, 14 pages.

*Primary Examiner* — Gregory M Desire
(74) *Attorney, Agent, or Firm* — Fish & Richardson P.C.

(57) ABSTRACT

A computer implemented method includes supplying to a client device prompts for a first individual to specify matching criteria for a potential introduction to a second individual. The matching criteria includes a filter to sort a pool of individuals by a facial feature categorized by a facial recognition module. Matching criteria from the client device are collected. Matches between the first individual and a pool of individuals are generated based upon the matching criteria. The matches are supplied to the client device. A match acceptance by the first individual of the second individual is collected. Attributes of the second individual are verified to selectively establish a verified status. Network communication between the first individual and the second individual are enabled in response to the verified status.

9 Claims, 3 Drawing Sheets

(56) References Cited

U.S. PATENT DOCUMENTS

| | | | |
|---|---|---|---|
| D781,311 S | 3/2017 | Rad et al. | |
| D781,334 S | 3/2017 | Rad et al. | |
| D791,809 S | 7/2017 | Rad et al. | |
| 9,733,811 B2 | 8/2017 | Rad et al. | |
| D798,314 S | 9/2017 | Rad et al. | |
| 9,753,948 B2* | 9/2017 | Lo | G06K 9/6247 |
| 9,959,023 B2 | 5/2018 | Rad et al. | |
| 10,021,344 B2* | 7/2018 | Farrell | H04L 67/303 |
| 10,318,109 B2 | 6/2019 | Desjardins | |
| 2006/0229896 A1 | 10/2006 | Rosen et al. | |
| 2008/0086431 A1 | 4/2008 | Robinson et al. | |
| 2012/0066118 A1* | 3/2012 | Dantas | G06Q 20/10 |
| | | | 705/39 |
| 2012/0136689 A1 | 5/2012 | Ickman | |
| 2012/0271380 A1 | 10/2012 | Roberts | |
| 2012/0290977 A1 | 11/2012 | Devecka | |
| 2013/0102299 A1 | 4/2013 | Liu | |
| 2013/0165234 A1 | 6/2013 | Hll | |
| 2013/0179925 A1 | 7/2013 | Woods | |
| 2013/0282745 A1 | 10/2013 | Mishra | |
| 2013/0282841 A1 | 10/2013 | Bates et al. | |
| 2013/0318162 A1 | 11/2013 | Wright | |
| 2013/0346564 A1 | 12/2013 | Warrick | |
| 2014/0032434 A1 | 1/2014 | Kumar | |
| 2014/0074824 A1 | 3/2014 | Rad et al. | |
| 2014/0195549 A1 | 7/2014 | Ahn | |
| 2014/0258260 A1* | 9/2014 | Rayborn | G06F 16/951 |
| | | | 707/707 |
| 2014/0328536 A1* | 11/2014 | Whitehill | G06K 9/6263 |
| | | | 382/159 |
| 2014/0344031 A1 | 11/2014 | Clinton et al. | |
| 2014/0357247 A1 | 12/2014 | Assuncao | |
| 2015/0058059 A1* | 2/2015 | Kahan | G06F 3/0482 |
| | | | 705/7.19 |
| 2015/0161632 A1 | 6/2015 | Humay | |
| 2015/0254618 A1 | 9/2015 | Shivaram | |
| 2015/0310507 A1 | 10/2015 | Woodward | |
| 2016/0132608 A1 | 5/2016 | Rathod | |
| 2016/0154569 A1 | 6/2016 | Rad et al. | |
| 2016/0316503 A1* | 10/2016 | Raphael | H04W 4/80 |
| 2016/0344777 A1 | 11/2016 | Fahlgren | |
| 2017/0337521 A1 | 11/2017 | Godbole | |
| 2017/0358033 A1 | 12/2017 | Montoya | |
| 2018/0029298 A1 | 2/2018 | Takaya et al. | |
| 2018/0150205 A1* | 5/2018 | Rad et al. | |
| 2018/0285986 A1 | 10/2018 | Perry | |
| 2019/0050920 A1 | 2/2019 | Kumar | |
| 2019/0080012 A1* | 3/2019 | Huang | G06F 16/9535 |
| 2019/0158305 A1 | 5/2019 | Cui | |
| 2019/0164108 A1 | 5/2019 | Chimka | |
| 2020/0134739 A1 | 4/2020 | Frolovichev | |
| 2020/0137003 A1 | 4/2020 | Frolovichev | |
| 2020/0137007 A1 | 4/2020 | Frolovichev | |

* cited by examiner

APPARATUS AND METHOD FOR COORDINATING THE MATCHING AND INITIAL COMMUNICATIONS BETWEEN INDIVIDUALS IN A DATING APPLICATION

FIELD OF THE INVENTION

This invention relates generally to social media dating applications deployed in computer networks. More particularly, this invention is directed toward techniques for coordinating the matching and initial communications between individuals in a dating application.

BACKGROUND OF THE INVENTION

Many individuals avoid social media dating applications if they are required to sort through large numbers of images of individuals. Thus, there is a need to only supply images that are consistent with a user's designated image attribute preferences. Similarly, many individuals dislike the receipt of large numbers of messages. Thus, there is a need to appropriately prioritize received messages in a dating application.

SUMMARY OF THE INVENTION

A computer implemented method includes supplying to a client device prompts for a first individual to specify matching criteria for a potential introduction to a second individual. The matching criteria includes a filter to sort a pool of individuals by a facial feature categorized by a facial recognition module. Matching criteria from the client device are collected. Matches between the first individual and a pool of individuals are generated based upon the matching criteria. The matches are supplied to the client device. A match acceptance by the first individual of the second individual is collected. Attributes of the second individual are verified to selectively establish a verified status. Network communication between the first individual and the second individual are enabled in response to the verified status.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
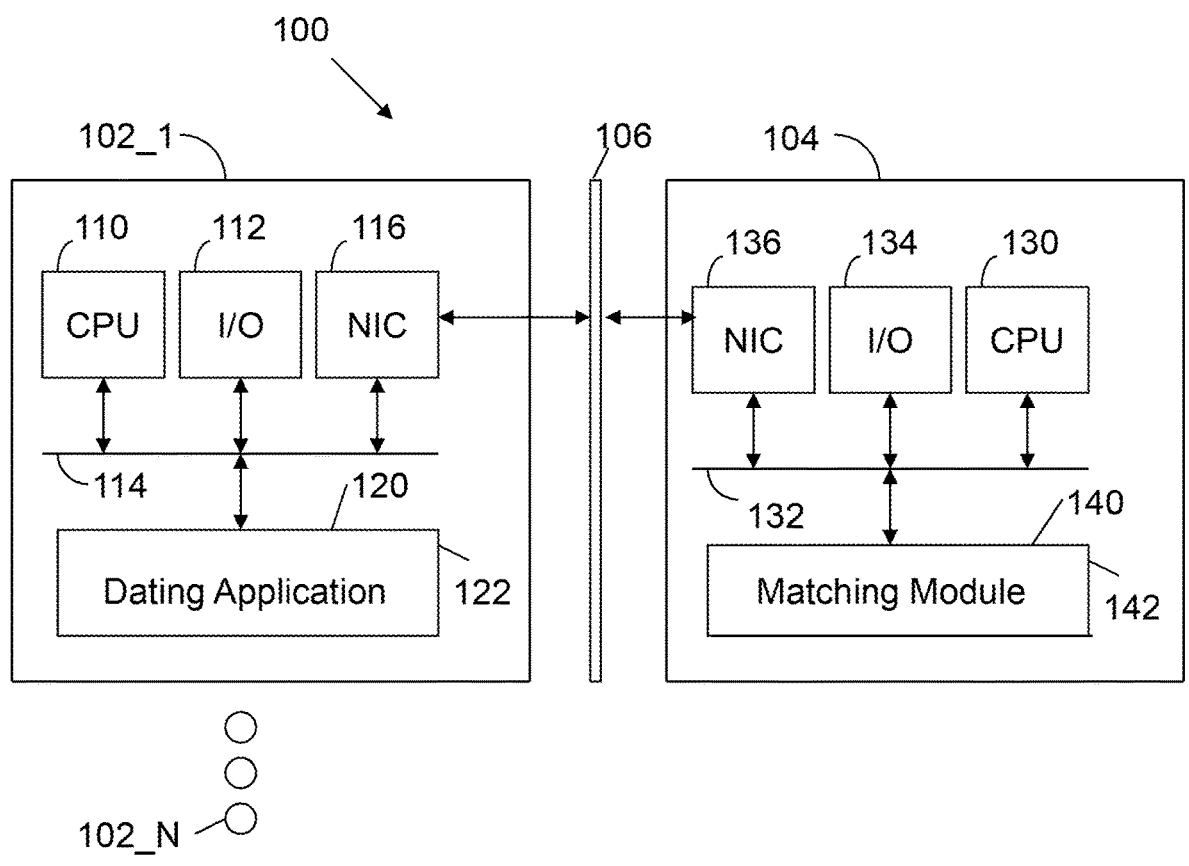
FIG. 1 illustrates a system configured in accordance with an embodiment of the invention.

FIG. 1 illustrates a system 100 configured in accordance with an embodiment of the invention. The system 100 includes a set of client devices 102_1 through 102_N in communication with a server 104 via a network 106, which may be any combination of wired and wireless networks. Each client device 102 includes a processor (e.g., central processing unit) 110 in communication with input/output devices 112 via a bus 114. The input/output devices 112 may include a keyboard, mouse, touch display and the like. A network interface circuit 116 is also connected to the bus 114 to provide connectivity to network 106. A memory 120 is also connected to the bus 114. The memory 120 stores instructions executed by the processor 110. In particular, the memory 120 stores a dating application 122, which communicates with server 104 to coordinate introductions between individuals that have been identified as potential matches. Typically, each client device 102_1 through 102_N is a mobile device executing the dating application 122. Different client devices 102_1 through 102_N are operated by different individuals that subscribe to the same dating application 122.

Server 104 includes standard components, such as a processor 130, bus 132, input/output devices 134 and a network interface circuit 136 to provide connectivity to network 106. A memory 140 is connected to the bus 132. The memory 140 stores a matching module 142 with instructions executed by the processor 130 to implement operations disclosed in connection with FIG. 2.

Figure 2:
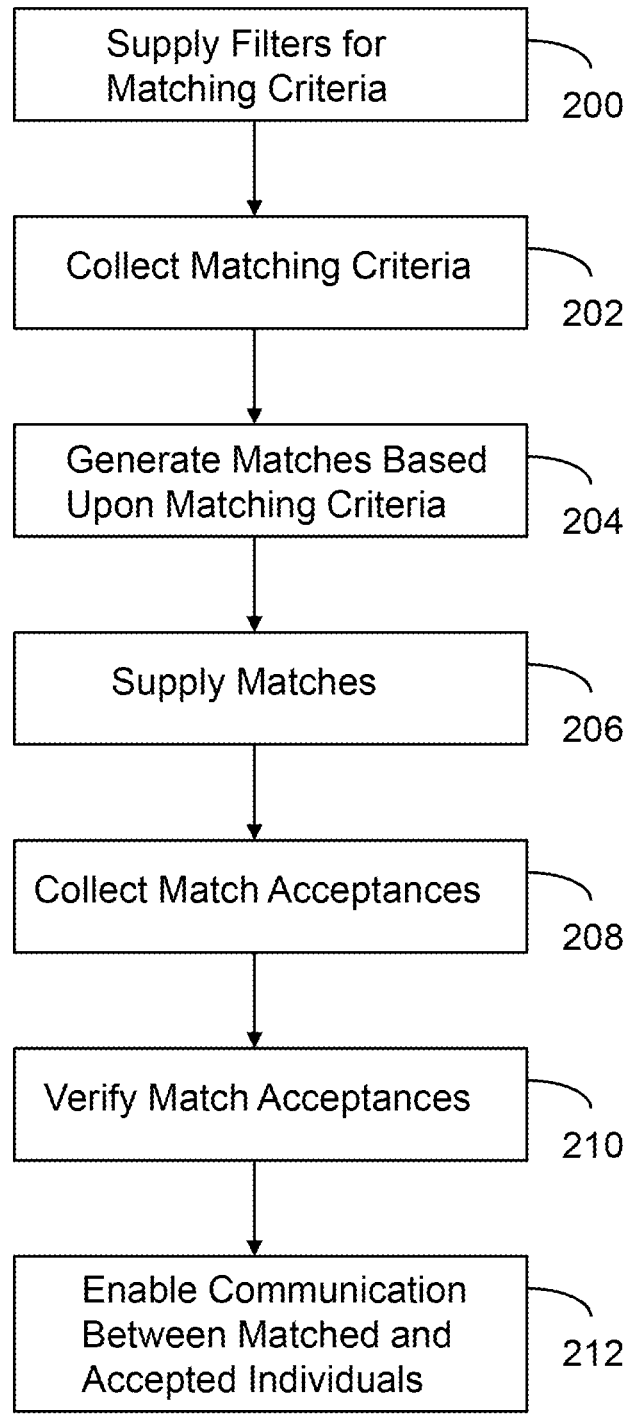
FIG. 2 illustrates processing operations performed in accordance with an embodiment of the invention.

Turning to FIG. 2, the matching module 142 initially supplies filters for matching criteria 200. That is, the matching module 142 supplies to a client device operated by a first individual a user interface with prompts that are used to collect matching criteria for a potential introduction to a second individual. The matching criteria includes a filter to sort a pool of individuals by a facial feature categorized by a facial recognition module. The matching module 142 stores images of individuals that subscribe to the data application. The matching module 142 includes a facial recognition module to categorize facial features of individuals that subscribe to the data application. The facial feature category may be one or more of eye color, eye size, hair color, hair colors, hair volume, hair shape, eyeglasses, eye brow prominence, cheek shape and the like.

Figure 3:
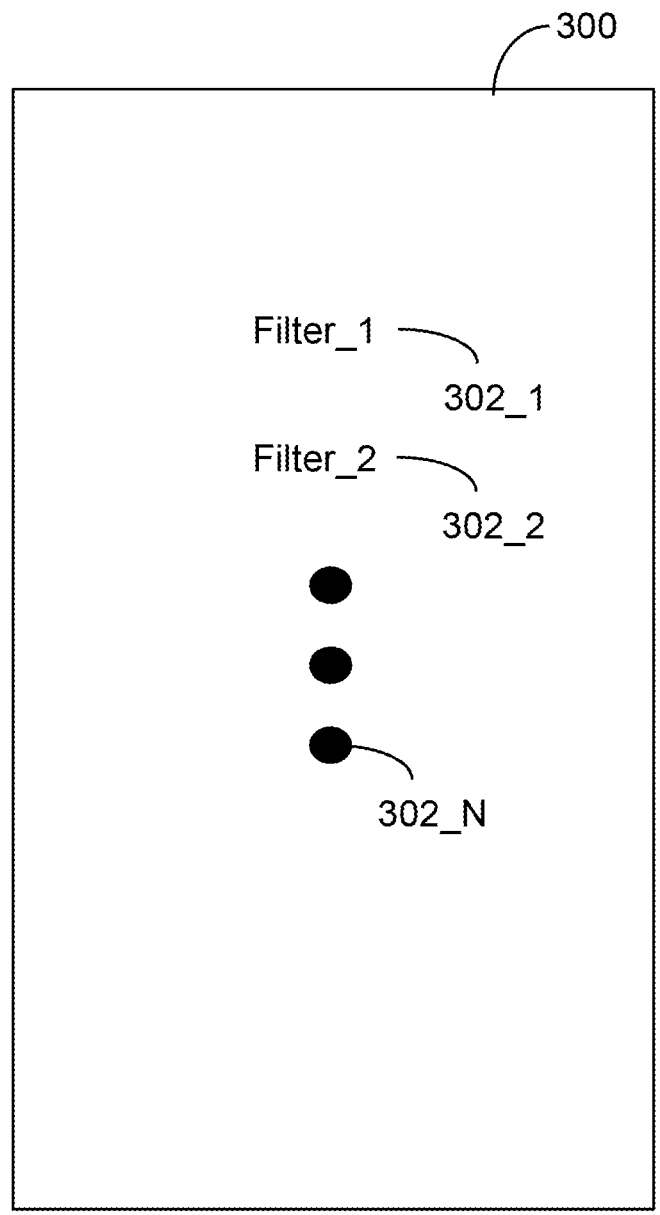
FIG. 3 illustrates a user interface configured in accordance with an embodiment of the invention.

FIG. 3 illustrates a user interface 300 that may be supplied from the matching module 142 to a client device 102 in accordance with an embodiment of the invention. The user interface 300 includes individual prompts 302_1 through 302_N for different filter criteria. The different filter criteria may be any of the facial feature categories identified above. A gesture (e.g., a swiping motion) is applied to the user interface 300 to specify an applicable filter. Filters may also specify a search radius (e.g., individuals with 10 miles) and an age range.

Thus, the interface 300 provides a simple social media dating application entry process that collects sufficient information to establish improved matches. The facial feature filters sort images that are consistent with a user's designated image attribute preferences, without the user having to do so. Consequently, fewer images are communicated across network 106, less memory is utilized by dating application 122 and fewer processing cycles are consumed by processor 110 of client device 102. More importantly, user satisfaction increases as a user receives better and fewer recommendations.

Returning to FIG. 2, matching criteria is collected 202 from client devices 102_1 through 102_N at the server 104. The matching module 142 then generates matches 204 based upon matching criteria. The matching criteria may be based upon any number of factors and may use any number of techniques including applied rules, collaborative filtering and/or machine learning. However, a critical filter condition is satisfaction of the facial feature attributes preferred by the user.

The matches are then supplied 206 from the matching module 142 at the server 104 to one or more client devices 102. Match acceptances are then collected 208 from client devices 102. For example, a photograph of an individual may be presented and a first gesture (e.g., a swipe down on the screen or a swipe to the left on the screen) may indicate no interest, while a second gesture (e.g., a swipe up on the screen or a swipe to the right on the screen) may indicate interest.

In one embodiment, an additional operation is performed after a match acceptance, namely verification of match acceptances 210. Verification may be in various forms. For example, verification may be verification of a user profile. For example, verification may require a minimum number of profile parameters to be completed (e.g., name, age, intelligible user image, etc.). Verification may be in the form of user information being verified, such as through a social network (e.g., Facebook®) or computer network identity resource (e.g., a server with White Page identity listings). This additional operation results in fewer images being communicated across network 106, less memory utilized by dating application 122 and fewer processing cycles consumed by processor 110 of client device 102. In addition, user satisfaction increases as a user receives better and fewer recommendations.

Network communication is then enabled between matched and accepted individuals 210. For example, network communication in the form of a text message may be enabled between a first individual and a second individual in response to a match between the first individual and the second individual and a match acceptance by at least one of the first individual and the second individual. The criteria to enable communication may be configured in a variety of manners. For example, it may be specified that only one gender may initiate communication. For example, the dating application 122 may be configured with a requirement that a female always initiate communication. In one embodiment, the dating application supplies a designated emoticon (e.g., a smiling face). Selection of the designated emoticon by the female results in the emoticon being sent to the matched individual and overrides the communication restriction that requires the female to communicate first. While the emoticon is a form of communication, it is simpler to send than a formulated textual message. Thus, the female is in a position to allow the matched individual to set the tone of the initial substantive communication.

Enabling communication may be predicated upon a single individual accepting a match. Alternately, enabling communication may be predicated upon a requirement that both a first individual and a second individual accept a match.

In one embodiment, the matching module 142 assigns a priority value to a received message. Messages may then be presented in a ranked priority order. Alternately, the priority value may be used to sort messages into discrete message priority categories (e.g., high priority, medium priority, low priority, probably unnecessary to review, dispose message, etc.). This ranking mechanism allows a user to focus on the most important messages and possibly ignore others. Thus, a user potentially spends less time on the dating application and the client device 102 consumes fewer cycles of the processor 110.

The priority value may be based on a number of consideration. The matching module 142 predicts a match compatibility value for each proposed match, which may be used to establish a priority value when one individual of the match contacts the other. The priority value may be based upon the dating application status of the matched individual, dating application behavior of the matched individual, along with other considerations. In one embodiment, the priority criteria is configurable by a user.

Thus, the matching module 142 facilitates a digital service that can connect individual users through mutual agreement (matching) for purposes including, but not exclusively, socializing, networking, and dating. The dating application 122 may be implemented as an application for a mobile device, a website or a standalone computer application.

A user's personal profile can include name, age, city, photographs, biographical text, links to social media profiles on other networks, and a range of other fields that allow users to characterize themselves. Once a profile is complete, a user can begin to view the profiles of other users, while the new profile is circulated among the user base.

A user receives profiles of other users who have met the filtering criteria; the user is able to explore the personal information that has been added to a profile. Profiles are served to the user one-by-one, with the option to look through multiple pictures per profile, expand text, and click through to external information and profiles on other social networks. To ascertain the mutual agreement to connect two users together, every profile viewed must be 'voted' on. Having viewed the personal profile of another user, the viewing user swipes (click and drag the profile using their finger) the served profile off the screen in a certain direction (e.g., right or up) if they would like to connect with that specific user or (e.g., left or down) if they do not.

In one embodiment, once a user has voted yes upon the profile of another user, the matching module 142 places the profile of the first user into the queue of profiles to be viewed by the second user. Through this mechanism the matching module 142 is able to accelerate the pace with which two users may view each-other's profiles than would happen in a purely organic system of profile selection.

In one embodiment, the system does not require that both users be online at the same time for a match to be suggested. In one embodiment, when one user votes yes and the other user votes no, no further connection is established between the two users, and their profiles may not be shown to each-other again (or they may be shown again depending on changes within their profile, location, search parameters, or because of time elapsed). When two users both mutually vote 'yes' upon the other user's profile, a connection is established between the two accounts which allows for direct communication. In one embodiment, matched users are directed to a direct messaging system supported by server 104. This system can display elements of a user's profile in order to increase recognition of the other user (e.g., name, age, photograph).

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer implemented method, comprising:
supplying to a client device prompts for a first individual to specify matching criteria for a potential introduction to a second individual, wherein the matching criteria includes a filter to sort a pool of individuals by a facial feature categorized by a facial recognition module;
collecting matching criteria from the client device;
generating matches between the first individual and a pool of individuals based upon the matching criteria;
supplying the matches to the client device;
collecting a match acceptance by the first individual of the second individual;
verifying attributes of the second individual to selectively establish a verified status; and
enabling network communication between the first individual and the second individual in response to the verified status.

2. The computer implemented method of claim 1 wherein the verified status is based upon a verified profile.

3. The computer implemented method of claim 2 wherein the verified profile includes a minimum number of profile parameters.

4. The computer implemented method of claim 2 wherein the verified profile includes parameters verified via a social network.

5. The computer implemented method of claim 2 wherein the verified profile includes parameters verified via a computer network identity resource.

6. The computer implemented method of claim 1 wherein enabling includes assigning a received message a priority value.

7. The computer implemented method of claim 6 wherein the priority value is associated with one of a plurality of discrete message priority categories.

8. The computer implemented method of claim 1 wherein enabling includes supplying to a client device a designated emoticon, wherein selection of the designated emotion overrides a communication restriction associated with enabling network communication.

9. The computer implemented method of claim 8 wherein the communication restriction is a requirement that a female initiate network communication.

* * * * *